United States Patent [19]
Larson

[11] Patent Number: 6,115,705
[45] Date of Patent: Sep. 5, 2000

[54] RELATIONAL DATABASE SYSTEM AND METHOD FOR QUERY PROCESSING USING EARLY AGGREGATION

[75] Inventor: Per-Åke Larson, Redmond, Wash.

[73] Assignee: Microsoft Corporation, Redmond, Wash.

[21] Appl. No.: 08/858,864

[22] Filed: May 19, 1997

[51] Int. Cl.$^7$ .................................................. G06F 17/30
[52] U.S. Cl. ...................................................... 707/3; 707/4
[58] Field of Search .................................. 707/1, 2, 3, 4

[56] References Cited

U.S. PATENT DOCUMENTS

| | | | |
|---|---|---|---|
| 5,055,999 | 10/1991 | Frank et al. | 364/200 |
| 5,367,675 | 11/1994 | Cheng et al. | 707/2 |
| 5,548,769 | 8/1996 | Baum et al. | 395/800 |
| 5,584,024 | 12/1996 | Shwartz | 707/4 |
| 5,655,080 | 8/1997 | Dias et al. | 395/200.32 |
| 5,742,806 | 4/1998 | Reiner et al. | 707/4 |
| 5,832,475 | 11/1998 | Agrawal et al. | 707/2 |
| 5,864,842 | 1/1999 | Pederson et al. | 707/3 |

OTHER PUBLICATIONS

Larson, "Dynamic Hash Tables," *Communications of the AMC*, vol. 31, No. 4, Apr. 1988, pp. 446–457.
Bitton et al., "Duplicate Record Elimination in Large Data Files," *ACM Transactions on Database Systems*, vol. 8, No. 2, Jun. 1983, pp. 255–265.
Teuhola et al., "Minimal Space, Average Linear Time Duplicate Deletion," *Communication of the AMC*, vol. 34, No. 3, Mar. 1991, pp. 63–73.
Shatdal et al., "Adaptive Parallel Aggregation Algorithms," SIGMOD, 1995, San Jose, CA, pp. 104–114.

*Primary Examiner*—Thomas G. Black
*Assistant Examiner*—Frantz Coby
*Attorney, Agent, or Firm*—Lee & Hayes, PLLC

[57] ABSTRACT

A relational database system has a non-volatile memory, a volatile memory for temporarily storing a set of data records, and a query processor. The volatile memory has an amount of available space for query processing that is segmented into multiple memory pages. Initially, these memory pages are empty and available in a pool for use by the query processor. The query processor establishes a partition table that defines multiple partitions. The query processor partitions incoming data records into the partitions according to a hashing function and stores the data records in memory pages associated with the partitions. As a new data record placed into a particular partition, the query processor attempts to aggregate the new data record with any like data record that already exists in the particular partition. If no like data record exists, the data record is stored separately on the memory page within the partition. In the event that a memory page of the partition becomes filled, the query processor retrieves an empty memory page from the free pool and assigns that empty memory page to the needy partition. In the event that no free memory pages are left in the pool, the query processor selects a memory page from any one of the partitions and writes the data records on the selected memory page to the non-volatile memory to free the memory page. The query processor selects the memory page according to selection criteria that favors output of full memory pages over partially filled memory pages and that favors memory pages with a low absorption rate. Data records with low activity are written to non-volatile memory in the interest of preserving data records with high absorption rates on the memory pages with the hope of absorbing future data records.

57 Claims, 9 Drawing Sheets

6,115,705

RELATIONAL DATABASE SYSTEM AND METHOD FOR QUERY PROCESSING USING EARLY AGGREGATION

TECHNICAL FIELD

This invention relates to relational database systems. More particularly, this invention relates to techniques for processing "group by" queries in relational database systems.

BACKGROUND OF THE INVENTION

Relational database systems are a type of database or database management system that stores information in tables—rows and columns of data—and conducts searches by using data in specified columns of one table to find additional data in another table. Typically, the rows of a table represent records (collections of information about separate items) and the columns represent fields (particular attributes of a record). An example of a relational database system is the SQL (Structured Query Language) Server database system manufactured and sold by Microsoft Corporation.

A particular type of query that is frequently used in relational database systems is to group records according to a particular parameter. A query of this type is often referred to as a "GROUP BY" query. As an example, suppose an administrator wants to tally a billing total for a particular customer from a number of invoices. Each record contains a customer identification number and a dollar amount. The administrator might formulate a GROUP BY query that groups the invoices according to customer ID and then subsequently tallies the dollar amounts on the invoices for each customer.

The data records are commonly stored on disk arrays or other forms of non-volatile memory. Queries performed on relational databases, such as the GROUP BY query, can be more easily accommodated if all of the data records are loaded into volatile memory (i.e. RAM) for processing. However, relational databases often contain large amounts of data, which far surpasses the volatile memory resources. As a result, records are handled in volatile memory in batch, and then written to disk as they are processed.

FIG. 1 shows a traditional approach to evaluating a GROUP BY query, which uses sorting and aggregation techniques. A data stream 20 has a series of data records that represent invoices. Each data record has a customer ID (the top number) and a dollar amount (the bottom number). For convenience, suppose that only two records can fit into volatile memory at a time. As a batch 22 of two records is loaded into volatile memory, the query process sorts the two records according to customer ID so that the highest numbered customer ID is first and the lowest numbered customer ID is second. The sorted batch, usually called a run, is then written to the storage disks. The process is repeated for each batch of two records to produce the data set 24 storing the runs.

Next, the query process reads the sorted runs from disk and merges them to produce the data set 26. The records in the merged data set 26 are now sorted according to customer ID. The query process then aggregates records with like customer IDs. Since the GROUP BY query is interested in a final billing total for each customer based on one or more invoices, all records having the same customer number can be aggregated and represented as a single record having the customer ID and a dollar value equal to the sum of the amounts in the individual records. Here, the two records for customer ID of 60 are combined into a single record having the customer ID of 60 and a tallied dollar amount of $86 (i.e., 54+32). Similarly, the two records for customer ID of 52 are also combined into a single record. The aggregation phase produces a data set 28.

Notice that the amount of data handled throughout the query process remains essentially constant until the final aggregation stage. It would be beneficial to reduce the amount of data earlier in the process. One prior art technique for achieving this goal is known as "early aggregation," in which like data records found in initial batches are combined early on, before the records are sorted and merged.

FIG. 2 shows a conventional query process, which utilizes an early aggregation technique. Batch 30 of the data stream 20 contains two records with the same customer ID of 60. Using an early aggregation process, the records are combined in volatile memory to form a single record with a summed dollar value. The result of the early aggregation process is a reduced data set 32, which has one less record than stream 20. The reduced data set 32 is then processed according to the same sorting, merging and aggregating processes described above for FIG. 1 to produce data sets 34, 36, and 38, respectively.

Early aggregation reduced the number of data records handled during the query process. In this simple example, only one record is eliminated early on; however, significant savings can be achieved when processing large numbers of data records.

A separate technique that is often used in large-scale queries is known as "hash partitioning." This technique involves hashing the data records according to a query parameter to put the records into smaller work files. The early aggregation, sorting, and merging can then be applied to the smaller work files.

FIG. 3 shows a conventional query process, which uses in part a hash partitioning process to place the records in smaller work groups. In FIG. 3, the data records are partitioned into one of five buckets according to the last digit in the customer ID. For instance, bucket 0, 5 is for all records in which the last digit of the customer ID is a zero or five. Each bucket has a dedicated piece of memory sized to hold two records.

The records are placed in the appropriate buckets according to the hashing function. Record 52, 10 is placed in bucket 2, 7 because the customer ID of 52 has a last digit of 2; record 77, 44 is placed in bucket 2, 7; and record 65, 12 is placed in bucket 0, 5. The next record 52, 30 has the same customer ID as the first record. An early aggregation process can be used at the bucket level to aggregate this record with the earlier record.

FIG. 4 shows the result of placing the record 52, 30 into bucket 2, 7. The records 52, 10 and 52, 30 are combined to form a single record 52, 40, which remains in the bucket 2, 7. Similarly, the next two data records 60, 54 and 60, 32 are combined in bucket 0, 5 to form a single record 60, 86. Notice that both buckets 0, 5 and 2, 7 are full. When a next record is received that cannot be aggregated with an existing record, an overflow condition is reached. To free up memory space in the bucket, one of its records is written to an output buffer. When the output buffer becomes full, its records are posted to a temporary file on the storage disk. Typically, the bucket memory operates on a first in, first out (FIFO) policy, and hence the first data record written into the memory is the one selected to be written out to the output buffer when the memory becomes full.

FIG. 5 shows the effect of adding a record to each of the buckets 0, 5 and 2, 7, thereby causing an overflow condition for each bucket. The record 65, 12 from bucket 0, 5, along with the record 52, 40 from bucket 2, 7, are written to the output buffer. The records remain in the output buffer until that buffer is full. Once full, the entire contents of the output buffer file are flushed to a temporary file on the storage disk to free the output buffer for more overflow records.

FIG. 6 shows an alternative construction in which an output buffer and associated temporary file on disk are allocated for each bucket. In this structure, the overflow records are posted to the output buffer associated with the bucket. As the output buffer for a corresponding bucket becomes full, its contents are written out to the associated temporary file on disk.

When the system reaches the end of the input data stream, the system repeats the aggregation process on the temporary files to further combine data records. The process is completed when all combinable data records are aggregated in main memory to produce a final output.

While these conventional techniques are effective, they do not fully capitalize on the benefits of early aggregation or efficiently use the allocated memory within the partitions. The inventor has developed a query process and data structure that overcomes these drawbacks.

SUMMARY OF THE INVENTION

This invention concerns a relational database system and method for processing queries in a manner that optimizes early aggregation in the context of hash partitioning to minimize the number of I/O operations and that efficiently utilizes memory available for the query process.

According to one implementation, a relational database system has a non-volatile memory, a volatile memory for temporarily storing a set of data records, and a query processor. The volatile memory has an amount of available space for query processing that is segmented into multiple memory pages. Initially, these memory pages are empty and available in a pool for use by the query processor.

The query processor establishes a partition table that defines multiple partitions. The query processor hashes incoming data records to an entry in the partition table. The entry directs the data records to the appropriate partitions. One memory page is initially assigned to each partition or alternatively taken from the free pool as needed by the partition. The data records are stored in the memory pages associated with the partitions. Before a new data record is placed into a particular partition, the query processor attempts to aggregate the new data record with any like data record that already exists in the particular partition. In one implementation, a separate, much larger, hash table is utilized for quick lookup of any like data records. If no like data record exists, the incoming data record is stored separately on one of the memory pages associated with the partition.

In the event that a memory page of the partition becomes full, the query processor retrieves an empty memory page from the free pool and assigns that empty memory page to the needy partition. In the event that no free memory pages are left in the pool, the query processor selects a memory page from any one of the partitions and writes the data records on the selected memory page to the non-volatile memory to free the selected memory page. The selected memory page is appended to a temporary file associated with the partition to which it belongs.

The query processor selects the memory page according to selection criteria that favors output of (1) full memory pages over partially filled memory pages and (2) memory pages with low absorption rates over memory pages with high absorption rates. In one particular implementation, the query processor selects the memory page based upon how recently the data records have been updated by being aggregated with incoming data records. Data records with low aggregation activity are written to non-volatile memory in the interest of preserving data records with high absorption rates on the memory pages in the hope of absorbing future data records.

The query process distinguishes between "unsafe" and "safe" records stored in memory. A record is "unsafe" if it was created after its hash partition spilled its first page to the associated temporary file. Otherwise, it is "safe". When the end of the data record series is reached, all safe records can be output directly without further processing. On the other hand, all unsafe records are processed further because they might subsequently merge with other records previously written to non-volatile memory. The query process can also be configured to distinguish between "unsafe" and "safe" memory pages. A memory page is considered "unsafe" as soon as it contains one unsafe record; otherwise, it is a "safe" memory page.

BRIEF DESCRIPTION OF THE DRAWINGS

FIG. 8 shows the data structures at an initial point in the query process.

FIG. 9 illustrates aggregation of two data records.

FIG. 10 illustrates assignment of free memory pages to predefined partitions.

FIG. 11 illustrates how memory pages in one partition are emptied and reassigned to another partition.

DETAILED DESCRIPTION OF THE PREFERRED EMBODIMENT

Figure 1:
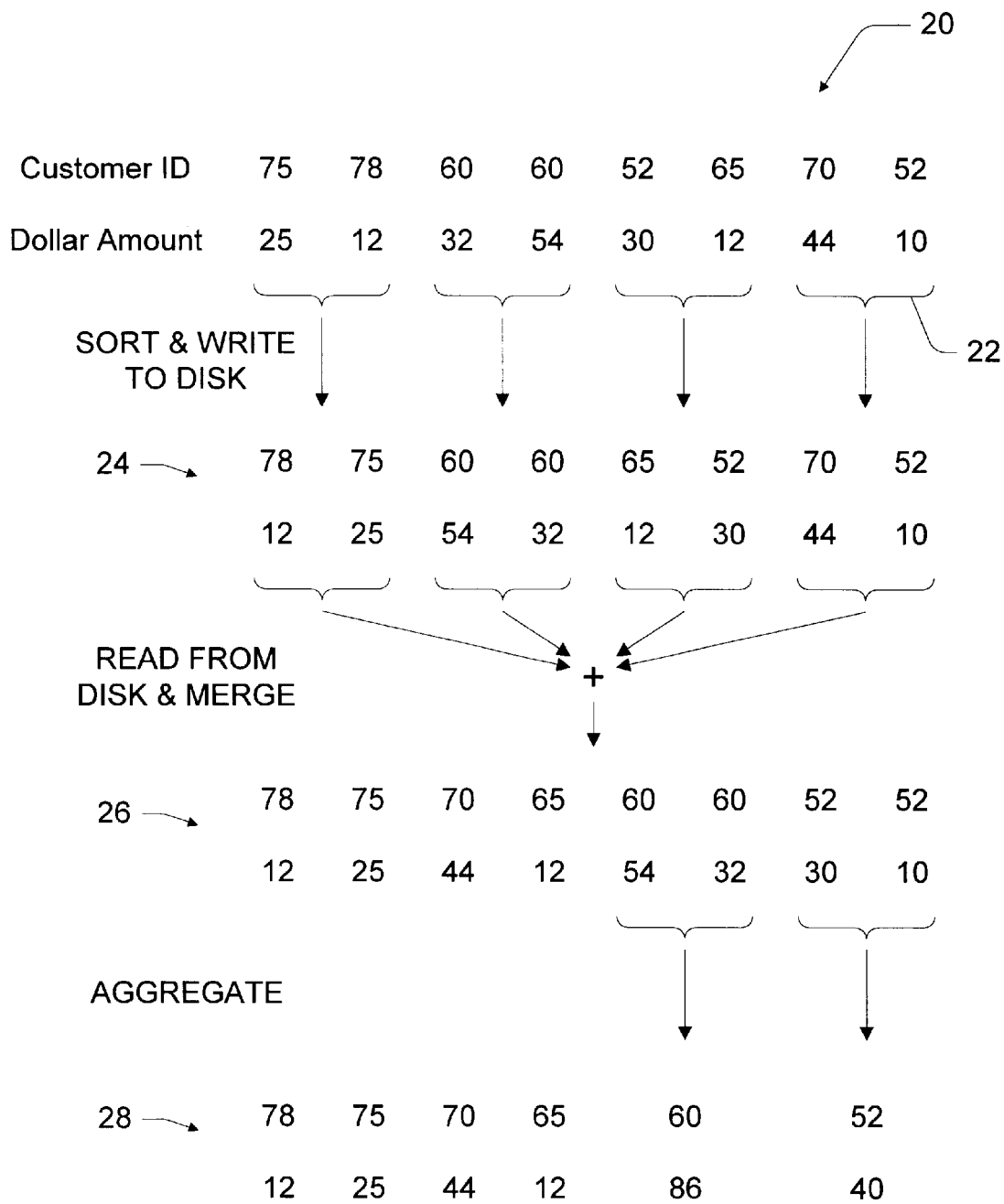
FIG. 1 is a diagrammatic illustration of a prior art query process for evaluating a GROUP BY query, which uses sorting and aggregation processes.
Figure 2:
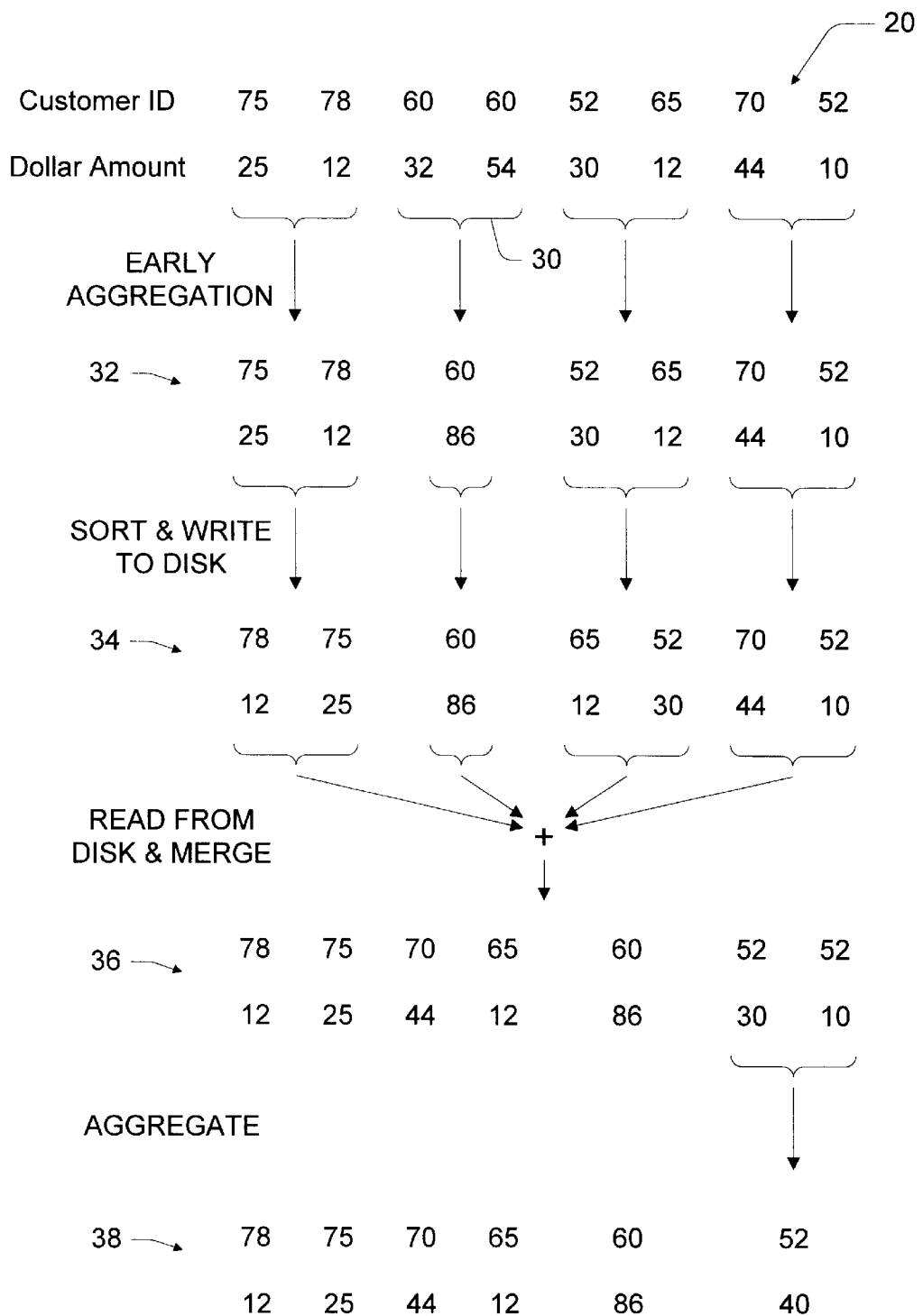
FIG. 2 is a diagrammatic illustration of the FIG. 1 query process, which includes an early aggregation phase.
Figure 3:
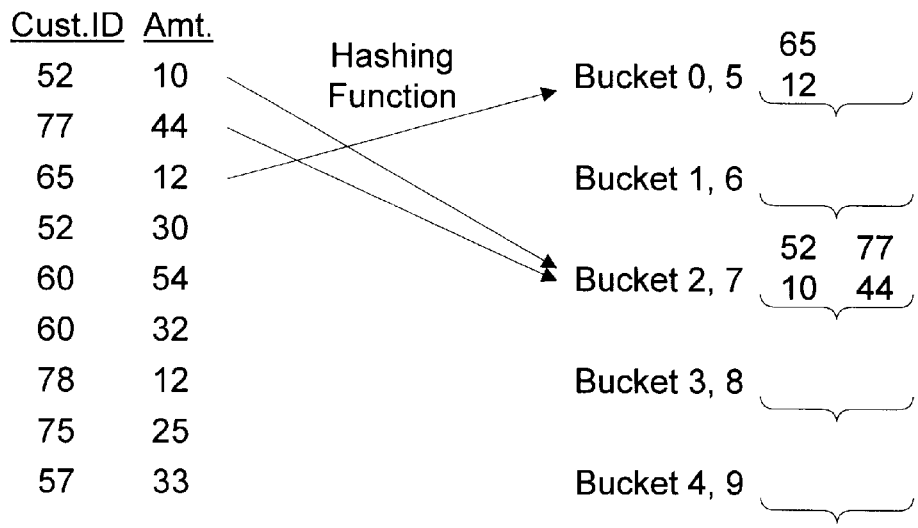
FIG. 3 is a diagrammatic illustration of a prior art hash partitioning process of segregating records into smaller work files or buckets.
Figure 4:
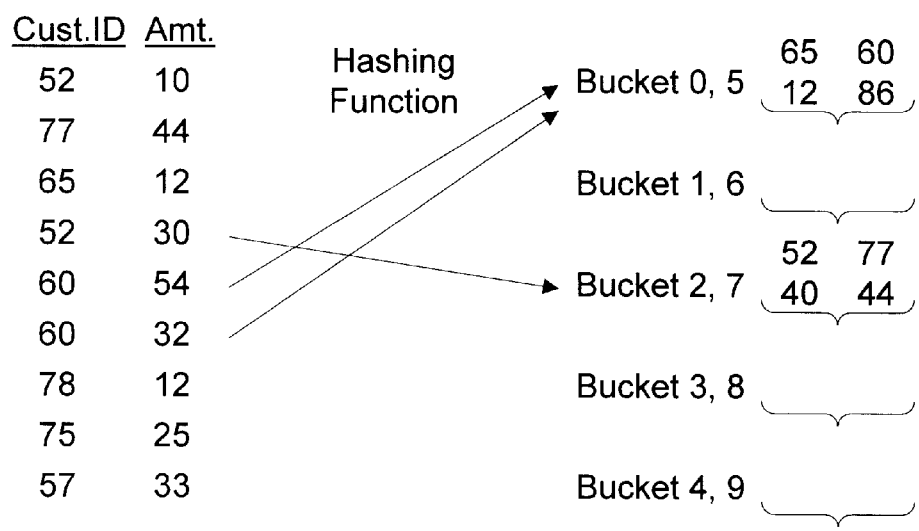
FIG. 4 is a diagrammatic illustration of the FIG. 3 hash partitioning process, which further shows an early aggregation phase within the buckets.
Figure 5:
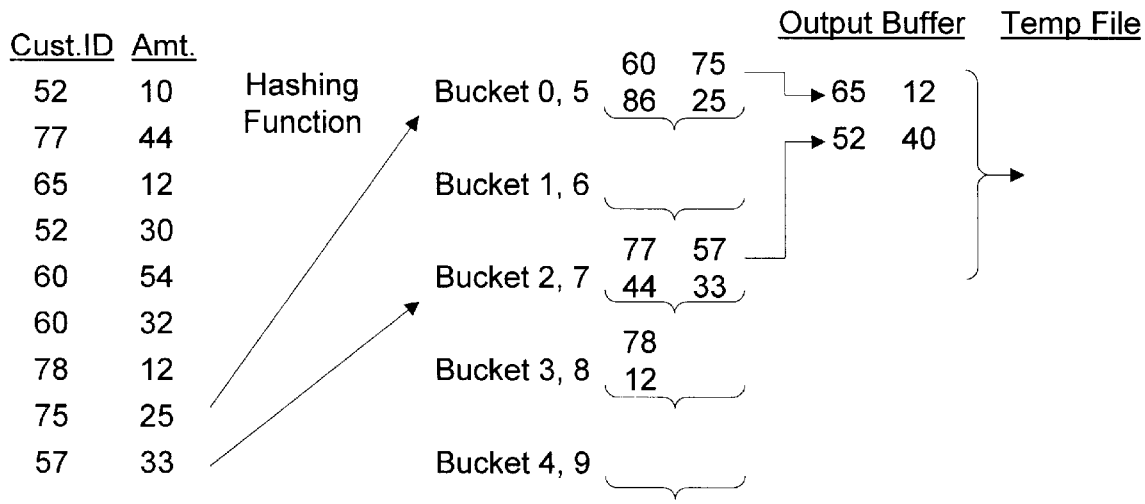
FIG. 5 is a diagrammatic illustration of the FIG. 3 hash partitioning process, which shows an overflow condition in which records are written to a temporary file.
Figure 6:
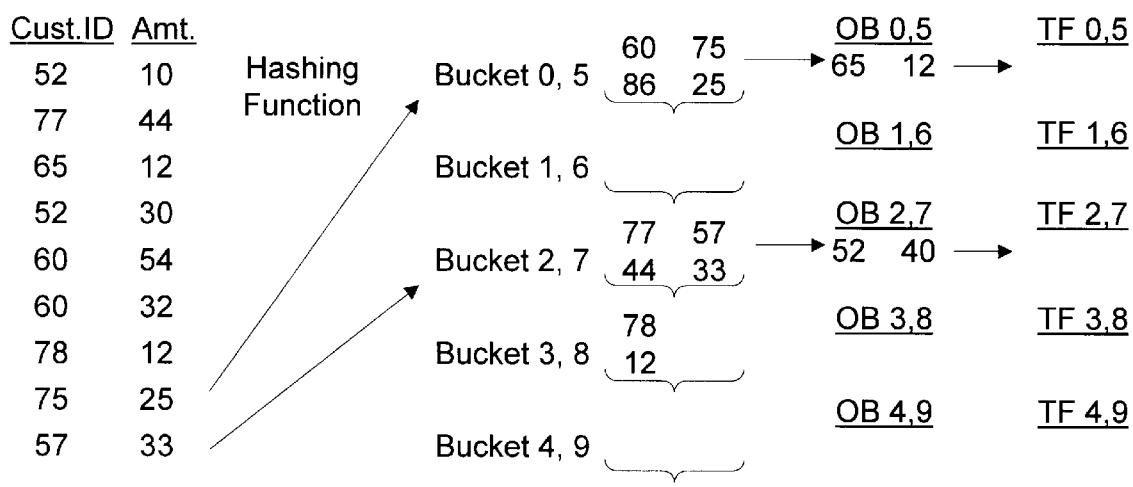
FIG. 6 is a diagrammatic illustration of the FIG. 3 hash partitioning process, which shows an overflow condition in which records are written to temporary files associated with their buckets.
Figure 7:
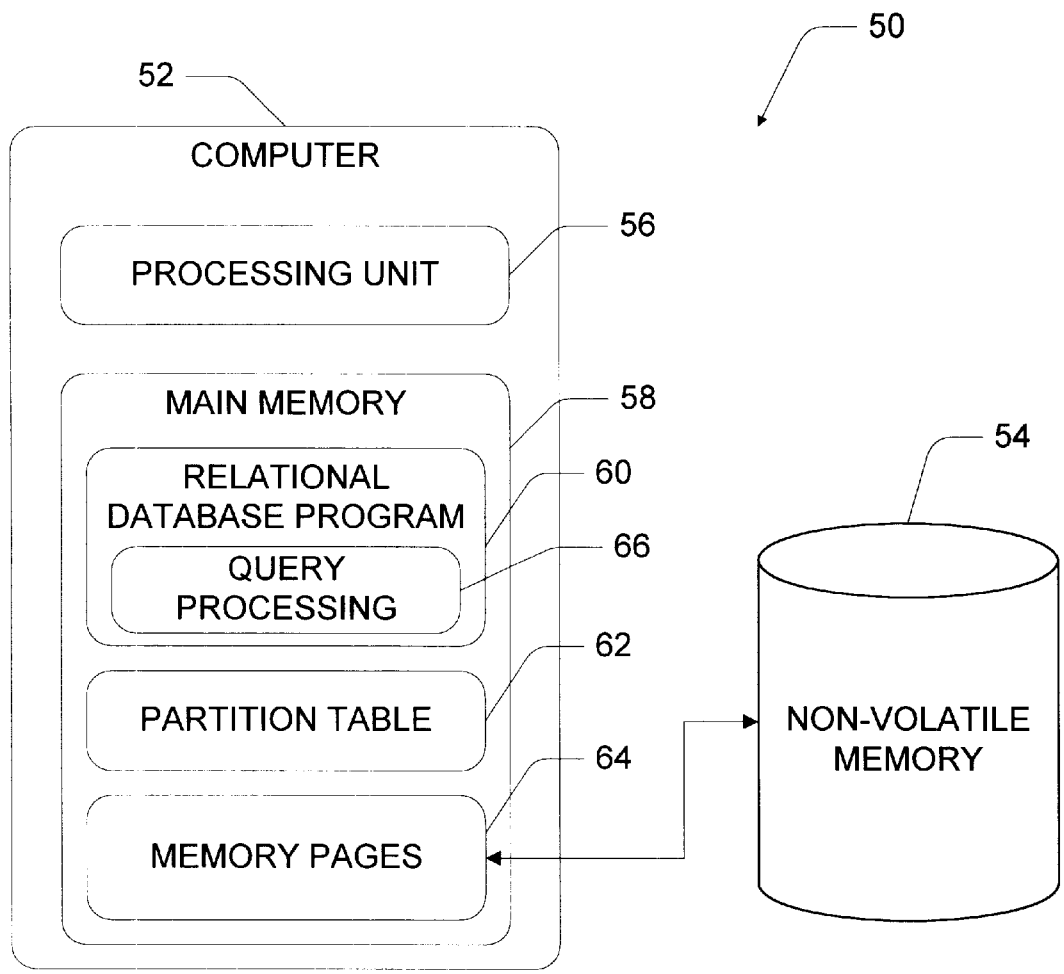
FIG. 7 shows a relational database computer system.

FIG. 7 shows a relational database system 50 having a computing unit 52 and a non-volatile memory 54 interfaced with the computing unit 52. The computer 52 has a processing unit 56 and a main memory 58. The main memory 56 is volatile and can be implemented, for example, as volatile RAM (Random Access Memory). The non-volatile memory 54 provides permanent storage for relational database records. The non-volatile memory 54 can be implemented in a variety of ways, including disk arrays, disk drives (e.g., hard and floppy), read/write CD ROMS, tape backups, reel-to-reel, and the like.

The relational database system 50 is shown in an operational state in which a relational database program 60 is loaded in main memory 58 for execution on the processing unit 56. The relational database program 60 is permanently stored on non-volatile memory 54 and loaded into the main memory 58 when launched. An example of a relational database program is the SQL Server program sold by Microsoft Corporation. It is also noted that aspects of this invention concerning query processing may be used in other types of programs that may employ relational database concepts, such as spreadsheet programs, accounting software, workflow management software, and the like.

The relational database program 60 has a query processing program 66 that implements aspects of this invention. The query processing program 66 utilizes hash partitioning to separate records into partitioned work files that are more easily managed. A partition table 62 is constructed by the query processing program 66 to contain entries identifying the various partitions. Data records are hashed to a particular entry in the partition table 62 and then placed in the partition referenced by that entry.

A portion of the main memory 58 is available for query processing. Preferably, the available memory is divided into fixed-size memory pages 64 that are utilized in the partitions to store the data records during processing. In this manner, the partitions are formed as one or more memory pages.

The relational database system 50 is representative of many diverse implementations, including a standalone computer, a database server for a network of PCs or workstations, an online server for Internet service providers, a mainframe computing system, and the like. The relational database system 50 runs on top of an operating system (not shown), which is preferably a multitasking operating system that allows simultaneous execution of multiple applications or multiple threads of one or more applications. Examples of suitable operating systems include a Windowsl® brand operating system sold by Microsoft Corporation, such as the Windows NT® workstation operating system, as well as UNIX based operating systems.

Figure 8:
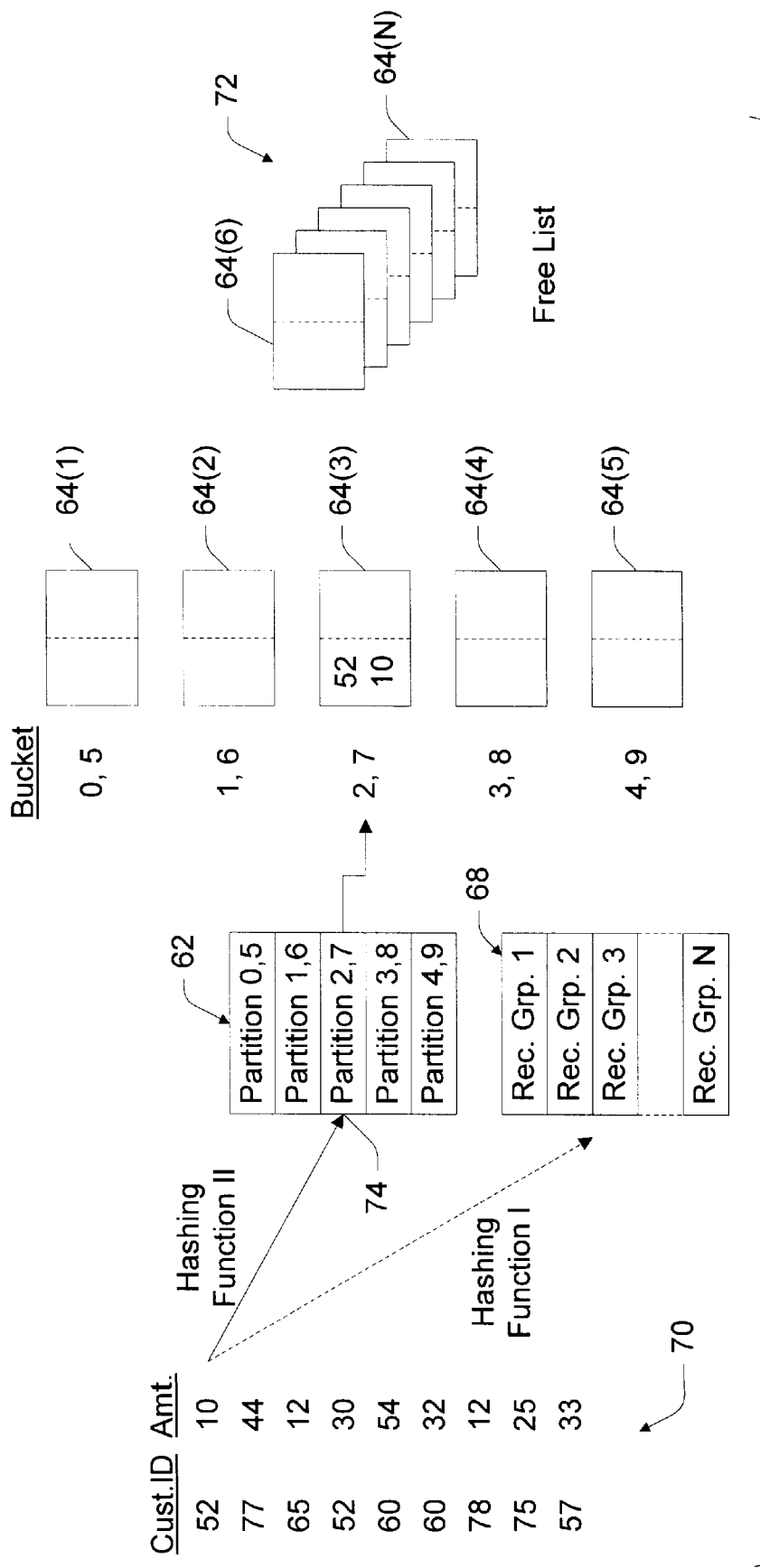
FIG. 8 is a diagrammatic illustration of data structures used in a query processing technique according to an exemplary implementation of this invention.

FIG. 8 shows how the relational database program 60 processes a GROUP BY query on a series of data records 70. In this example, the data records 70 represent invoices having a customer ID and a dollar amount. The series of data records is loaded sequentially into main memory 58. The data records 70 can originate from a number of different sources, such as from permanent files on the non-volatile memory 54, or from an executing application, or from a remote source on a network. For purposes of this discussion, suppose an administrator formulates a GROUP BY query that groups the invoices according to customer ID and then subsequently tallies the dollar amounts in the invoices for each customer to produce a final billing record having a customer ID and total dollar amount owed.

The relational database program 60, and more particularly the query processing program 66, creates a hash or partition table 62 having a number of entries that reference corresponding partitions. In this example, the hash function partitions the data records according to the last digit in the customer ID into five partitions or buckets. The five entries in partition table 62 identify the five buckets.

The memory pages 64(1)–64(N) are initially empty and placed in a free list 72. In this example, the memory pages are sized to hold two records, although in practice the memory pages will hold many records. The memory pages are taken from the free list 72 and assigned to the appropriate bucket as the incoming data records warrant. Alternatively, the query processing program initially assigns at least one memory page for each bucket, as is shown in FIG. 8. The entries in the partition table 62 reference the chain of one or more memory pages 64 in the buckets. The entries may contain a pointer to a particular memory location, or some other means for identifying the chains of memory pages.

The query processing program 66 also creates a separate, much larger, hash table 68 to enable fast lookup of matching records. The match lookup table 68 has many more entries than partition table 62 and is accessed using a different hashing function than the function used for the partition table. Each entry contains a chain of pointers to individual data records in the memory pages 64. Unlike the partition table, many entries in the match lookup table 68 pertain to records on the same memory page. The number of data records referenced by each entry is thus significantly less than the number of data records in a partition referenced by the partition table 62. In this manner, the query processing program 66 can quickly lookup through the match hash table 68 to determine whether the data record matches an existing data record.

As each data record 70 is received, the query processing program 66 applies the first hashing function I to hash the data record according to its query parameter (i.e., grouping column), which in this case is the customer ID, to an entry in the match lookup table 68. In this example, there are no records yet stored in the memory pages, and hence no match will exist.

The query processing program 66 then hashes the data record using a second hashing function II to an entry in the partition table 62. The first data record 52, 10 is hashed to an entry 74 in the partition table 62. Many different kinds of hashing functions can be used for each table. Preferably, the hashing function used for the partition table is designed to provide an even distribution of records among the partitions. One preferred hashing function is described in an article by Per-Ake Larson entitled *Dynamic Hash Tables, Communications of the ACM,* 31, 4 (1988), pg. 446–457. The partition table entry 74 contains a reference to partition 2, 7. As a result, the first data record 52, 10 is placed in the memory page 64(3) of bucket 2, 7. The first data record fills in one of the two slots on the memory page 64(3). A reference to the record is also added to the match lookup table 68.

The relational database program 60 continues to process the incoming data records 70. As more data records are processed, the query processing program 66 attempts to aggregate like data records within the partitions. The query processing program 60 hashes each record to an entry in the match lookup table 68 and compares the query parameter (i.e., customer ID) with those of the existing data records referenced by the table entry in an attempt to find a match. If a match is found, the aggregation columns (i.e., the dollar amount) are updated (in this case summed) immediately, and the query processing program continues with the next record without use of the partition table. If no match is found, however, the query process program 66 hashes the data record to an entry in the partition table and the data record is placed by itself into a memory page of the appropriate partition.

Figure 9:
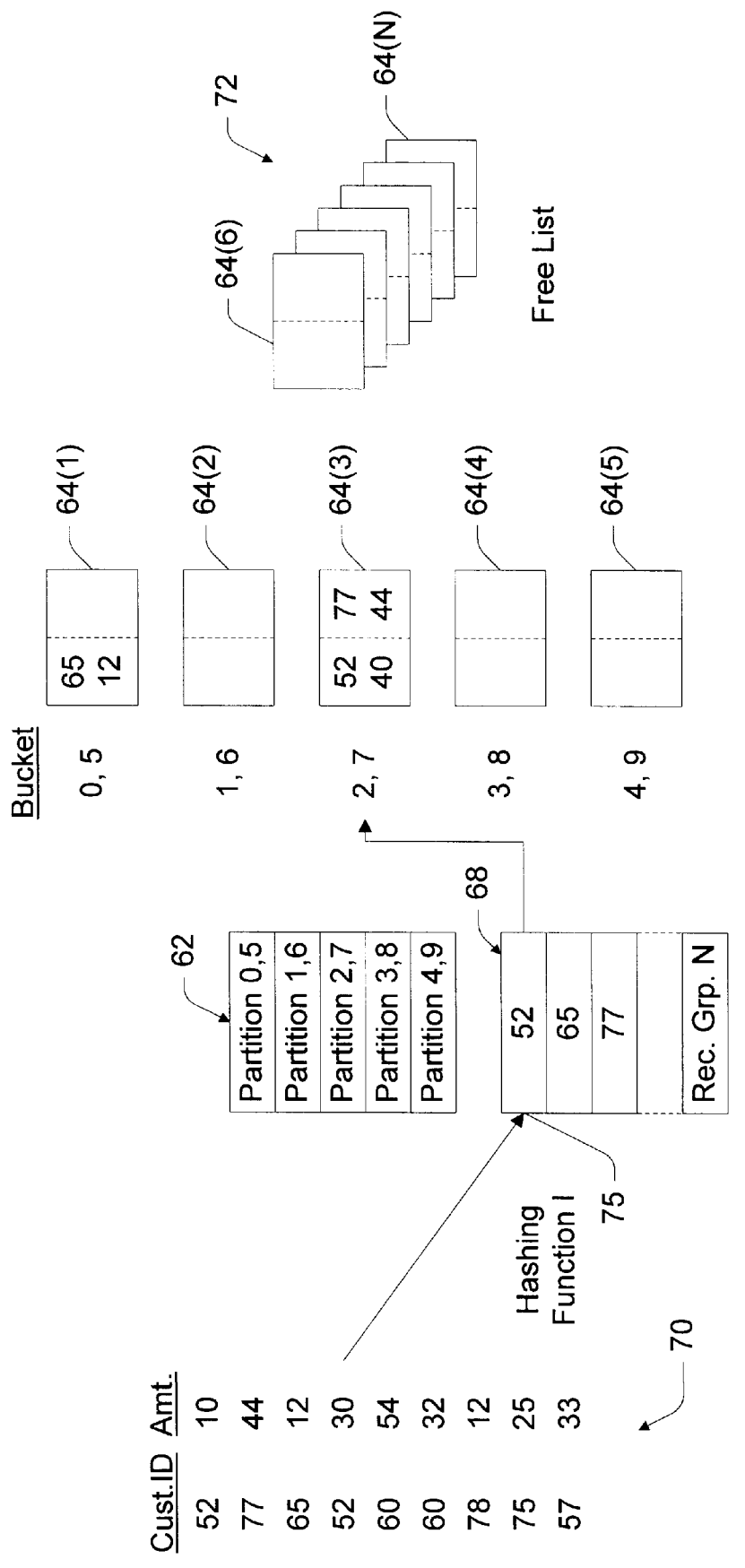
FIG. 9 shows the FIG. 8 data structures at a point in the query process subsequent to that shown in FIG. 8.

FIG. 9 shows the same structure of FIG. 8, but at a point when two records are aggregated. When the fourth data record 52, 30 is reached, the query processing program 66 hashes the record according to the hashing function I to an entry 75 in the match lookup table 68. In this example, the customer ID 52 matches an existing record. Accordingly, the query processing program 66 aggregates the two records in memory page 64(3) of bucket 2, 7. The combined records have summed dollar amount of 40 (i.e., 10+30). When a match is found, the query processing program proceeds to the next data record. The match lookup table speeds up the aggregation process in comparison to attempting to match through the partition table (although the partition table may be used for match lookup).

Eventually, the memory pages become full. An overflow condition results when the query processing program attempts to add a new data record to a full memory page. When an overflow condition occurs, the relational database program appends a memory page from the free list 72 to the appropriate partition and links the memory page to the existing chain for that partition.

Figure 10:
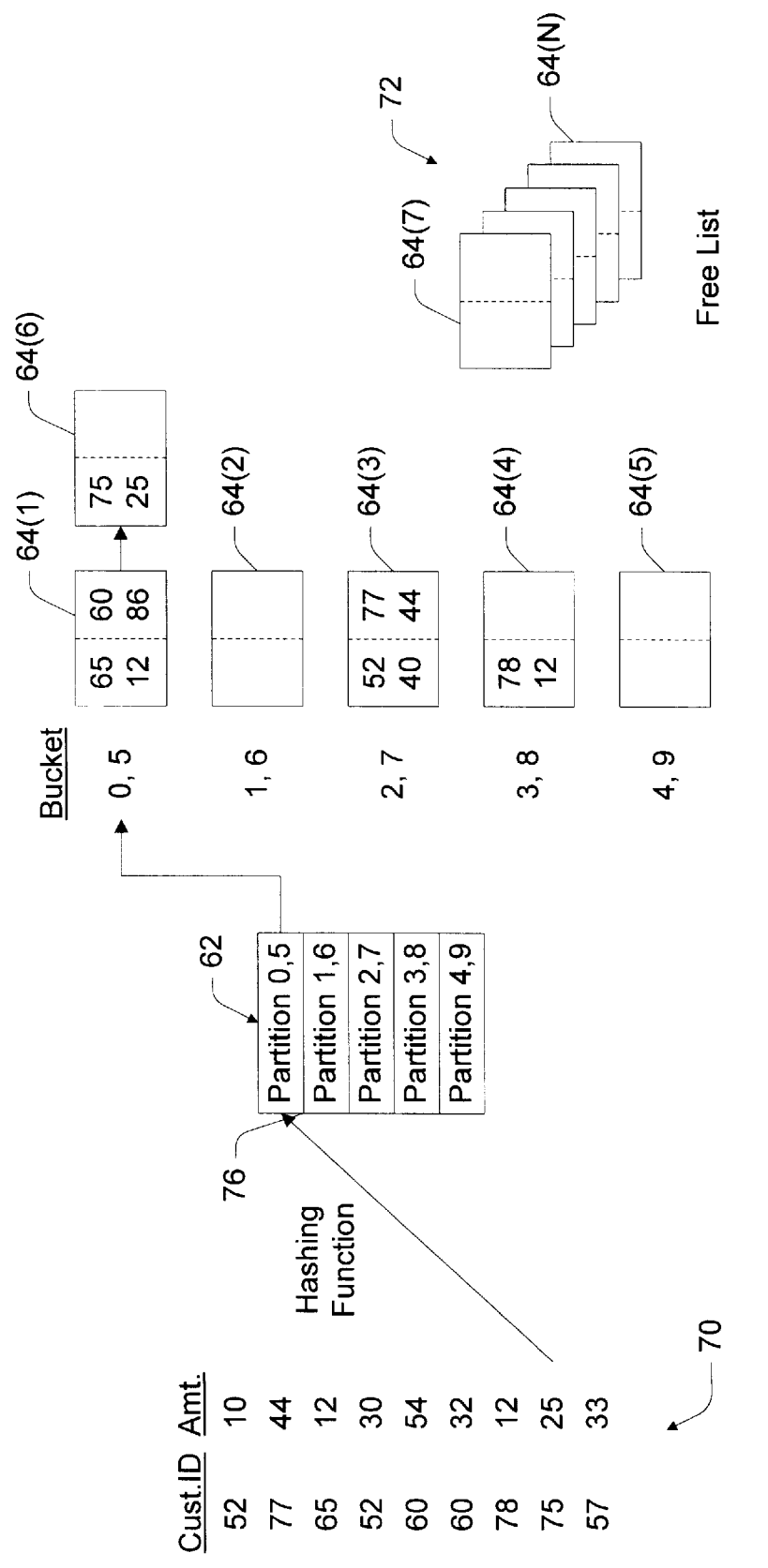
FIG. 10 shows the FIG. 8 data structures at a point in the query process subsequent to that shown in FIGS. 8 and 9.
Figure 11:
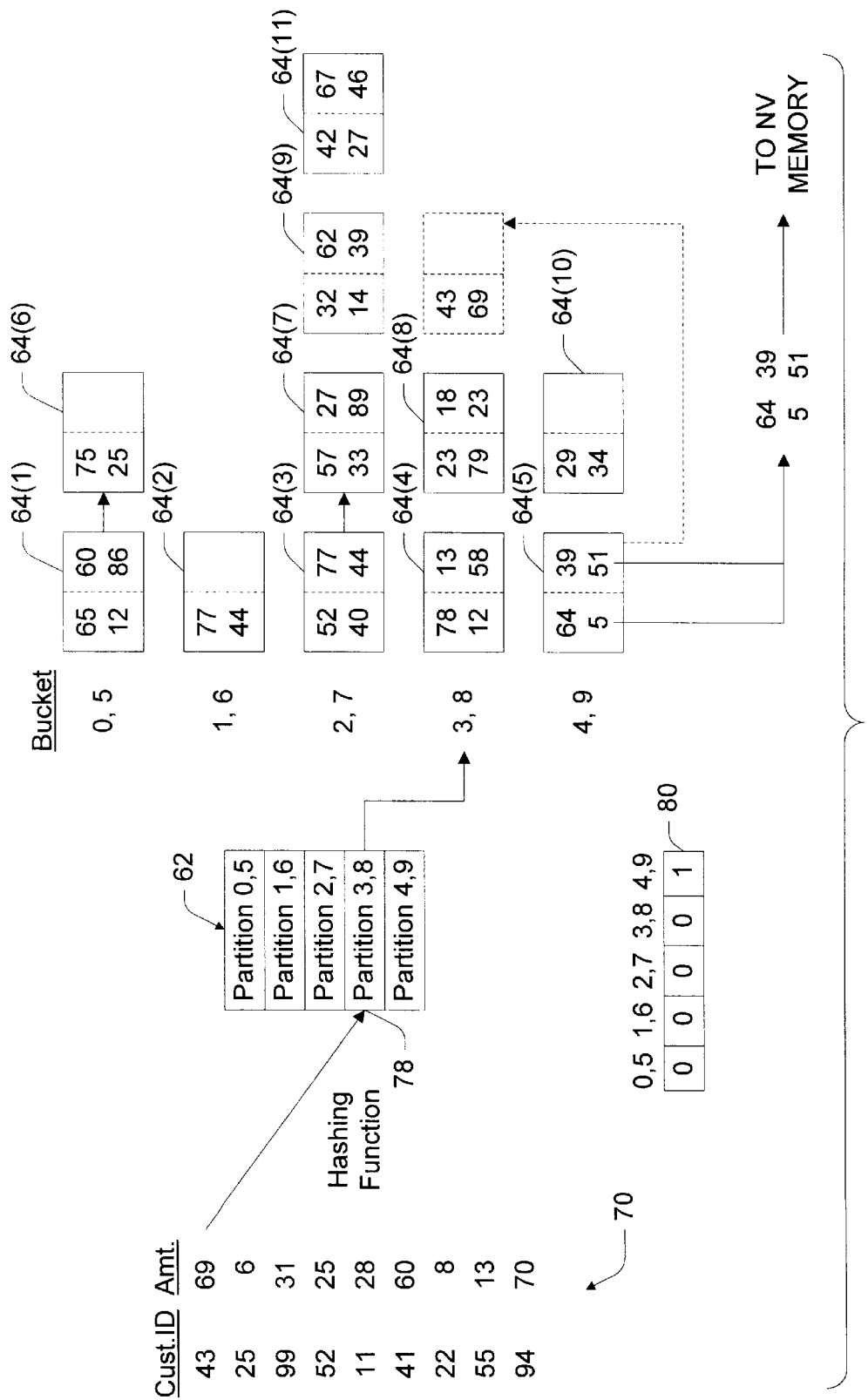
FIG. 11 shows the FIG. 8 data structures at a point in the query process subsequent to those of FIGS. 8–10.

Note that the subsequent explanation assumes that the match lookup table is still used even though it is not explicitly shown in FIG. 10 and FIG. 11.

FIG. 10 shows the same structure of FIGS. 8 and 9, but after an overflow condition is reached. The data record 75, 25 in the series 70 hashes to an entry 76 in the partition table 62, which references bucket 0, 5. The query processing program 66 attempts to aggregate the new data record 75, 25 with an existing record, but there is no match. Accordingly, the query processing program will store the new data record 75, 25 individually. However, the memory page 64(1) is full and hence an overflow condition results. When the overflow condition occurs, the relational database program appends a new memory page 64(6) to the full memory page 64(1) in bucket 0, 5. The data record 75, 25 is then placed in the new memory page 64(6).

This process of filling the partitions continues until there are either no more free memory pages or no more input records. If the series of data records 70 runs out before the available memory space is exhausted, the relational database program simply outputs all data records in the memory pages to the non-volatile memory and the process is finished. All of the data records are grouped and aggregated, and the results can be presented to the administrator. On the other hand, if the available memory space is exhausted before the data records run out, the relational database program must empty one or more memory pages by writing the contents out to non-volatile memory to create additional free space.

FIG. 11 shows the same structure of FIGS. 8–10, but after many data records have been partitioned. All of the memory pages 64(1)–64(11) have been assigned to one of the partitions. The next data record 43, 69 in the series 70 is hashed to entry 78 of the partition table 62. Entry 78 references bucket 3, 8. Here, both of the memory pages 64(4) and 64(8) in the bucket 3, 8 are filled. In addition, there are no more memory pages in the free list (not shown). In this situation, the relational database program must empty a page to accommodate the next data record. The issue is which memory page should be written to the non-volatile memory.

According to an aspect of this invention, the relational database program selects a victim memory page according to a selection criteria that favors output of (1) full memory pages over partially filled memory pages and (2) memory pages with low absorption rates over memory pages with high absorption rates. The first criteria attempts to optimize the I/O resources by outputting a memory page with more data, rather than less. The second criteria is based on the theory that data records with low absorption rates (meaning that they have not often aggregated with like data records) are less likely, if left in the buckets, to aggregate with incoming data records. Hence, these data records should be written to non-volatile memory in the interest of preserving data records with high absorption rates (meaning that they tend to aggregate more often) on the memory pages in the hope of absorbing a higher percentage future data records. The goal is to aggregate data records as much as possible while the records are in the memory pages of volatile memory because it reduces the number of I/Os used during the query processing.

The selection process can be implemented to examine absorption rates of individual data records or of pages (i.e., an average of multiple data records). Once the relational database program finds the data record or page that has the lowest absorption rate, the relational database program writes the entire memory page out to the non-volatile memory.

An alternative is to select individual data records from one of the partitions according to the selection criteria, copy those individual records to an output buffer, and write the (full) buffer to the temporary file associated with the partition. The drawback with this approach is that the relational database program must set aside memory for the output buffer that could otherwise be used for early aggregation in the buckets.

The memory page (or set of individual records) selected as the victim can be taken from any partition, regardless of which partition needs the emptied memory page. That is, the relational database program need not empty a memory page in the specific bucket into which the next data record will go. Rather, the relational database program can empty a memory page in another bucket and then transfer that empty memory page from its original bucket to the needy bucket to receive the incoming data record.

Suppose in FIG. 11, for instance, that memory page 64(5) is selected as having the lowest absorption rate. The relational database program empties the memory page 64(5) to a partition file in the non-volatile memory. There is preferably one permanent partition file for each partition in main memory. Writing the data records on memory page 64(5) to non-volatile memory frees the memory page 64(5) for use in the same or different partition. In this example, the empty memory page 64(5) is moved to a different bucket 3, 8. The incoming data record 43, 69 can then be placed in the transferred memory page 64(5).

It is noted that all memory pages in a partition can be moved to other partitions if the conditions warrant. For example, suppose that the query processing program selects memory page 64(2)—the only page in bucket 1, 6—as the victim. Page 64(2) would be emptied to non-volatile memory, cleaned, and transferred to bucket 3, 8. This process would leave no memory pages in bucket 1, 6. This situation, however, is not a problem since the next record directed to the bucket 1, 6 would cause an overflow condition for that partition, and the query processor would free up a memory page from elsewhere and move the emptied memory page to the bucket 1, 6.

To overlap writing to partition files on the non-volatile memory and processing incoming data records, an implementation variation is to maintain a selected number of memory pages on the free list, rather than allowing the free list to exhaust completely. In this manner, an additional memory page is always available from the free list.

The relational database program is described above as writing out one page at a time. If the pages are small, the program might write out multiple pages at a time to further reduce I/O processes. This technique is particularly advantageous when incorporated into a system that supports gather-write and scatter-read. However, all pages that are written out should belong to the same partition, which makes selecting the set of pages more complex.

Selecting memory pages based on absorption rates is beneficial as it optimizes the opportunity for early aggregation in the main memory. This, in turn, tends to minimize the number of I/Os to non-volatile memory. In addition, the ability to select memory pages as victims from any partition is beneficial as it enables preservation of memory pages with the higher absorption rates, regardless of where they are, to remain in the main memory. Moreover, the sharing of memory pages among the various partitions is beneficial because the program can flexibly adapt to the incoming data records. At one point in the series, one partition might be experiencing a high absorption rate and thus can benefit by having a disproportionately higher number of memory pages; whereas at a different point in the series, another partition might be experiencing a high absorption rate and could benefit from more memory pages. The adaptability of the query process can be advantageous for data streams that have temporal clustering in which like records tend to be grouped together in the series, even though the series is otherwise evenly distributed. Memory sharing adapts to such conditions to optimize keeping high absorptive records in main memory and outputting low absorptive records to non-volatile memory.

Another benefit of organizing memory according to chains of pages and a free pool is that it is very easy to adjust the amount of memory used for aggregation at run time. To decrease memory usage, certain memory pages are selected as victims and output to the non-volatile memory. The space is then returned to the system. To increase memory, more memory space is requested from the system, formatted as pages, and added to the free pool. Whether and when to increase or decrease memory usage is a policy decision that depends on the operating environment of the system.

The relational database program tracks whether partitions have had memory pages written out to non-volatile memory. Partitions that have had one or more memory pages written out to non-volatile memory are said to have "spilled", whereas partitions that have not yet had any memory pages output are said to be "unspilled." The relational database distinguishes between spilled and unspilled partitions, as this information is useful upon reaching the end of the input record stream 70.

FIG. 11 shows a register 80 that holds a bit for each partition. The bit is a binary "0" when the partition is unspilled and set to a binary "1" when the partition changes to being spilled. In this example, the partition 4, 9 is spilled as a result of writing the data records of memory page 64(5) out to non-volatile memory. Hence, the bit for partition 4, 9 is set to "1", while the remaining bits are "10".

The relational database also distinguishes between "safe" and "unsafe" data records. A new record is marked "safe" if it is created in an unspilled partition, otherwise it is marked "unsafe". Records are marked safe or unsafe when they are created (and do not change state thereafter). When reaching the end of the input data stream, safe records can be sent to the final output because no more aggregation of those records is possible. Unsafe records are written to the partition file in non-volatile memory for further processing because these data records might still be aggregated more with data records previously written to the partition file.

The safe-unsafe concept can be applied to memory pages instead of records. A memory page starts out being safe. As soon as it receives an unsafe record (a record created after the partition has spilled), the page changes state to unsafe. When reaching the end of the input data stream, all safe pages can be sent to the final output while unsafe pages have to be written to the partition file.

The following discussion provides one exemplary implementation of a selection policy that attempts to select records or pages with the least absorption rate. In general, the query processing program 66 can be configured to select the data record that has been least recently aggregated (LRA) with another data record, and to write out the data record or memory page containing that record. The relational database program maintains several LRA queues. Memory pages are assigned to the queues based on a fill factor and whether they are safe or unsafe.

As an example, suppose that records are fixed length and that a memory page has room for ten records. The relational database program creates a total of twenty LRA queues (plus a list of free pages): one queue for any unsafe pages that currently store ten records, one queue for any safe pages that currently store ten records, one queue for any unsafe pages currently storing nine records, one queue for any safe pages currently storing nine records, and so on. At any one time, there may be none, one, or more pages listed in any one of the queues. When a memory page needs to be emptied, the relational database program goes to the queues and selects a victim in the same order. The program first looks in the "10 record, unsafe" queue. If no page is listed, it proceeds to the "10 record, safe" queue, and then to the "9 record, unsafe" queue, and then to the "9 record, safe" queue, and so on. The first page found is written to its partition file, cleaned, and freed for reuse. Other search orders representing different trade-offs are possible.

This approach can be easily adapted to variable length records. For variable length records, the relational database program establishes a number of fill factor ranges for each memory page and assigns two LRA queues for each fill factor range. For example, the fill factor ranges for each page could be: over 90% filled, 80–90% filled, 70–80% filled, and so on down to 10% filled. It is not necessary that all ranges are the same size; any division into ranges will do. However, uniform ranges make it easier to determine to which queue a page belongs.

To speed up the searching for a victim page, one might be inclined to use a large partition table and assign multiple entries to the same partition file. This is not preferred, however, as it results in poor memory utilization and low absorption rates, thereby increasing the volume of intermediate data. Instead, the partition table size should be determined by the number of memory pages available. In experiments conducted by the inventor, the table size was set to the number of pages divided by five, with an upper bound of 50. This achieves an intermediate data volume close to minimum. To increase search speed, it is more desirable to maintain a separate, much larger, hash table that is used strictly for lookup.

The following is an example of pseudo-code used to implement the query process. FS is a list of files to be processed.

```
add input file of data records to FS;
while FS is not empty do
    select an input file F from FS;
    Initialize data structures and create partition files;
    while F is not empty do
        get next input record from F;
        locate existing group record with matching values on the
            grouping columns;
        if no matching record is found then
            determine which partition P the input record belongs to by
                hashing on the grouping columns;
            locate free space for a new group record on one of the
                pages belonging to partition P;
            if no free space is found then
                if there are no free pages then
                    select a set of pages with low absorption rate and all
                        belonging to the same partition, to output;
                    write the selected pages to the corresponding
                        partition file;
                    clean the pages and add them to the free list of
                        pages;
                endif
                get a free page and attach it to partition P;
                locate free space for a group record on the newly added
                    page;
            endif
            initialize a group record matching the input record;
            if the partition file for partition P is still empty, mark the
                new record as being safe, otherwise mark it as being
                unsafe;
        endif
        update the aggregation functions of the group record;
    endloop
    /* Reached end of input file F */
    delete input file F and remove it from FS;
    write every page containing only safe group records to the final
        output;
    write all other pages to their associated partition files;
    add all non-empty partition files to FS;
    clear all auxiliary data structures;
endloop
```

The invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A relational database system comprising:

a non-volatile memory;

a volatile memory for temporarily storing a set of data records, the volatile memory having an amount of space available for query processing;

a query processor coupled to the non-volatile and volatile memories to process a query of the data records according to at least one query parameter, the query processor being configured to partition the data records into multiple buckets for query processing using the available space in the volatile memory; and the query processor being configured to aggregate data records having like query parameters and to occasionally select ones of the data records for writing to the non-volatile memory to free up part of the available space to receive additional data records, the query processor selecting the data records for writing to the non-volatile memory according to how likely the data records will aggregate, if left in the buckets, with the data records to be added.

2. A relational database system as recited in claim 1, wherein the query processor partitions the data records using a hash partitioning process.

3. A relational database system as recited in claim 1, wherein the query processor selects the data records having the least absorption rate for writing to the non-volatile memory.

4. A relational database system as recited in claim 1, wherein the query processor selects the data records that have been least recently aggregated for writing to the non-volatile memory.

5. A relational database system as recited in claim 1, wherein the query processor dynamically utilizes the available space among different ones of the buckets without requiring a specific quantity of available space be reserved for any particular one of the buckets.

6. A relational database system as recited in claim 1, wherein the query processor distinguishes between "unsafe" buckets from which the selected data records are written to the non-volatile memory and "safe" buckets that have not yet had data records written to the non-volatile memory.

7. A relational database system as recited in claim 1, wherein the query processor selects and writes at least one data record to the non-volatile memory in an event that addition of a new data record causes an overflow condition indicating that the available space will be exceeded.

8. A relational database system as recited in claim 1, wherein the available space is configured as a pool of memory pages.

9. A relational database system as recited in claim 8, wherein the query processor initially allocates at least one memory page per bucket.

10. A relational database system as recited in claim 8, wherein the query processor moves an empty memory page from one of the buckets to another of the buckets.

11. A relational database system as recited in claim 8, wherein when the query processor selects a data record to write to the non-volatile memory, the query processor writes a memory page that contains the selected data record.

12. A relational database system as recited in claim 8, wherein the query processor partitions the data records into memory pages associated with corresponding buckets, and in an event that addition of a new data record to one of the buckets causes an overflow condition indicating that all of the memory pages are full, the query processor selects the data records for writing to the non-volatile memory from any one of the buckets.

13. A relational database system comprising:

a non-volatile memory;

a volatile memory for temporarily storing a set of data records, the volatile memory having an amount of space available for query processing;

a query processor coupled to the non-volatile and volatile memories to process a query of the data records according to at least one query parameter, the query processor being configured to partition the data records into multiple buckets for query processing using the available space in the volatile memory; and the query processor being configured to aggregate data records having like query parameters and to occasionally select ones of the data records for writing to the non-volatile memory to free up part of the available space to receive additional data records, the query processor selecting the data records for writing to the non-volatile memory from any one of the buckets.

14. A relational database system as recited in claim 13, wherein the query processor selects the data records for writing to the non-volatile memory according to how likely the data records will aggregate, if left in the buckets, with the additional data records to be added.

15. A relational database system as recited in claim 13, wherein the query processor selects the data records having the least absorption rate for writing to the non-volatile memory.

16. A relational database system as recited in claim 13, wherein the query processor selects the data records that have been least recently aggregated for writing to the non-volatile memory.

17. A relational database system as recited in claim 13, wherein the query processor distinguishes between first ones of the buckets from which the selected data records are written to the non-volatile memory and second ones of the buckets that have not yet had data records written to the non-volatile memory.

18. A relational database system as recited in claim 13, wherein the available space is configured as a pool of memory pages.

19. A relational database system as recited in claim 18, wherein the query processor initially allocates at least one memory page per bucket.

20. A relational database system as recited in claim 18, wherein the query processor dynamically moves empty memory pages among the buckets.

21. A relational database system as recited in claim 18, wherein when the query processor selects a data record to write to the non-volatile memory, the query processor writes a memory page that contains the selected data record.

22. A relational database system comprising:
a volatile memory for temporarily storing a set of data records for query processing;
a query processor coupled to the volatile memory to process a query of the data records, the query processor being configured to partition the data records into multiple partitions using a hash partitioning table, the hash partitioning table having entries that reference the partitions; and
the query processor being configured to create a second hash table separate from the partitioning table that has entries that reference individual data records within the partitions, the separate hash table being used to lookup matching data records for aggregation.

23. A relational database system comprising:
a non-volatile memory;
a volatile memory for temporarily storing a set of data records, the volatile memory having an amount of available space segmented into multiple memory pages;
a query processor coupled to the non-volatile and volatile memories to process a series of data records, the query processor being configured to partition the data records into multiple partitions and store the data records in one or more memory pages associated with the partitions;
as a new data record is processed into a particular partition, the query processor being configured to alternately aggregate the new data record with a like data record already existing in the particular partition or store the data record separately within the particular partition;
in an event that a memory page of the particular partition becomes full, the query processor assigns an additional memory page to the particular partition; and
in an event that no free memory pages are left to assign, the query processor selects a memory page from any one of the partitions, writes the data records on the selected memory page to the non-volatile memory to empty the memory page, and moves the emptied memory page to the particular partition.

24. A relational database system as recited in claim 23, wherein the query processor selects the memory page according to selection criteria that favors output of full memory pages over partially filled memory pages and that favors memory pages with a low absorption rate over memory pages with a high absorption rate.

25. A relational database system as recited in claim 23, wherein the query processor moves empty memory pages among the partitions to satisfy incoming data records.

26. A relational database system as recited in claim 23, wherein the query processor transfers all memory pages from one of the partitions to others of the partitions.

27. A relational database system as recited in claim 23, wherein the query processor distinguishes between first partitions from which one or more memory pages are written to the non-volatile memory and second partitions that have not yet had any associated memory page written to the non-volatile memory.

28. A relational database computer program embodied on a computer-readable medium comprising:
partitioning code to partition data records into multiple partitions;
aggregation code to aggregate within respective partitions like data records; and
victim selection code to select at least one data record to write to non-volatile memory to free space in the partitions for future data records, the victim selection code selecting the data record according to how likely that data record will aggregate, if left in its respective partition, with the future data records.

29. A relational database computer program as recited in claim 28, wherein the partitioning code partitions the data records using a hash partitioning process.

30. A relational database computer program as recited in claim 28, wherein the victim selection code selects the data record with the least absorption rate.

31. A relational database computer program as recited in claim 28, wherein the victim selection code selects the data record that has been least recently aggregated.

32. A relational database system comprising:
a memory; and
a processing unit coupled to the memory and configured to execute the relational database computer program as recited in claim 28.

33. In a relational database system having data records that are partitioned into partitions and aggregated within the partitions, a query processing program executable on the relational database system to remove at least one data record that has the least absorption rate from a partition.

34. A query processing program as recited in claim 33, further configured to remove the data record that is least recently aggregated.

35. A query processing program as recited in claim 33, further configured to remove the data record from any one of the partitions.

36. A relational database computer program embodied on a computer-readable medium comprising the query processing program as recited in claim 33.

37. In a relational database system having data records that are partitioned into partitions and aggregated within the partitions, a query processing program executable on the relational database system to add data records to respective partitions until an overflow condition in a particular partition is reached indicating that that memory space available for the partitions is full, the query processing program removing at least one data record from any one of the partitions to free memory space to receive future data records.

38. A query processing program as recited in claim 37, further configured to remove the data record that has the least absorption rate.

39. A query processing program as recited in claim 37, further configured to remove the data record that is least recently aggregated.

40. A relational database computer program embodied on a computer-readable medium comprising the query processing program as recited in claim 37.

41. In a relational database system having multiple memory pages for holding data records that are separated into predefined partitions, a query processing program executable on the relational database system to move empty memory pages among the partitions.

42. A query processing program as recited in claim 41, further configured to aggregate the data records within the partitions wherein the partitions having the data records with the highest absorption rates tend to have associated more memory pages that the partitions having the data records with the lowest absorption rates.

43. A relational database computer program embodied on a computer-readable medium comprising the query processing program as recited in claim 41.

44. A method for processing a query, comprising the following steps:

partitioning data records into multiple partitions;

aggregating within respective partitions like data records; and selecting at least one data record to write to non-volatile memory to free space in the partitions for future data records according to how likely that data record will aggregate, if left in its respective partition, with the future data records.

45. A method as recited in claim 44, wherein the partitioning step comprises the step of partitioning the data records using a hash partitioning process.

46. A method as recited in claim 44, wherein the aggregating step comprises the step of hashing each new data record to an entry in a hash table which references any like data records in the partitions.

47. A method as recited in claim 44, wherein the selecting step comprises the step of selecting the data record with the least absorption rate.

48. A method as recited in claim 44, wherein the selecting step comprises the step of selecting the data record that has been least recently aggregated.

49. A computer programmed to perform the steps in the method as recited in claim 44.

50. A computer-readable medium having computer-executable instructions for performing the steps in the method as recited in claim 44.

51. In a relational database system having multiple memory pages for holding data records that are separated into predefined partitions, a method for processing a query of the data records, comprising the following steps:

partitioning a new data record into one of the partitions;

if a like data record already exists in the partition, aggregating the new data record with the like data record and otherwise storing the data record separately within the partition;

in an event that a memory page of the partition is full and cannot accept the new data entry, adding a next memory page to the partition; and in an event that no free memory pages are left to add, selecting a memory page from any one of the partitions according to a selection criteria that favors output of full memory pages over partially filled memory pages and that favors memory pages with low absorption rates and writing the data records on the selected memory page to non-volatile memory to empty the memory page.

52. A method as recited in claim 51, wherein the partitioning step comprises the step of partitioning the new data record using a hash partitioning process.

53. A method as recited in claim 51, further comprising the step of moving the empty memory page to another partition to satisfy incoming data records.

54. A method as recited in claim 51, further comprising the step of transferring all memory pages from one of the partitions to others of the partitions.

55. A method as recited in claim 51, further comprising distinguishing between first partitions from which one or more memory pages are written to the non-volatile memory and second partitions that have not yet had any associated memory page written to the non-volatile memory.

56. A computer programmed to perform the steps in the method as recited in claim 51.

57. A computer-readable medium having computer-executable instructions for performing the steps in the method as recited in claim 51.

* * * * *

UNITED STATES PATENT AND TRADEMARK OFFICE
CERTIFICATE OF CORRECTION

PATENT NO : 6,115,705
DATED     : Sep. 5, 2000
INVENTOR(S): Per-Ake Larson

It is certified that error appears in the above-identified patent and that said Letters Patent is hereby corrected as shown below:

In Column 9, line 55, replace "10" with --0--.

In Column 10, line 32, add --LRA-- between "the" and "queues".

Signed and Sealed this

Twenty-ninth Day of May, 2001

Attest:

NICHOLAS P. GODICI

*Attesting Officer*     *Acting Director of the United States Patent and Trademark Office*